United States Patent
Taylor et al.

(10) Patent No.: US 10,789,659 B2
(45) Date of Patent: Sep. 29, 2020

(54) PROVISION OF REAL-ESTATE MARKET INFORMATION

(71) Applicant: Redfin Corporation, Seattle, WA (US)

(72) Inventors: Andrew Taylor, Seattle, WA (US); Alexander D. Aickin, Seattle, WA (US); Bryan J. Selner, Seattle, WA (US); Glenn Kelman, Seattle, WA (US); Robert Law, Seattle, WA (US); Allen Xiao, Seattle, WA (US); Eugenia Nemenman, Seattle, WA (US); April Alexander, Seattle, WA (US); Andrew Bartkus, Seattle, WA (US); Llewellyn Botelho, Seattle, WA (US); Robert Gay, Seattle, WA (US); James Lamb, Seattle, WA (US); Gordon Brown, Seattle, WA (US); Noah Maas, Seattle, WA (US); Jadwiga Zyzanska, Seattle, WA (US); Lisa Taylor, Seattle, WA (US); Adam Wiener, Seattle, WA (US)

(*) Notice: Subject to any disclaimer, the term of this patent is extended or adjusted under 35 U.S.C. 154(b) by 13 days.

(21) Appl. No.: 15/811,340

(22) Filed: Nov. 13, 2017

(65) Prior Publication Data
US 2018/0068402 A1    Mar. 8, 2018

Related U.S. Application Data

(63) Continuation of application No. 14/214,155, filed on Mar. 14, 2014, now abandoned.
(Continued)

(51) Int. Cl.
*G06Q 30/00* (2012.01)
*G06Q 50/16* (2012.01)
*G06Q 30/06* (2012.01)

(52) U.S. Cl.
CPC ......... *G06Q 50/16* (2013.01); *G06Q 30/0611* (2013.01)

(58) Field of Classification Search
CPC ........ G06Q 30/00; G06Q 30/06; G06Q 10/10; G06Q 20/10
See application file for complete search history.

(56) References Cited

U.S. PATENT DOCUMENTS

| 5,032,989 A | 7/1991 | Tornetta |
| 5,414,621 A | 5/1995 | Hough |

(Continued)

OTHER PUBLICATIONS

Colorado Real Estate, 2004, www.coloradosbestbroker.com/pages/vip_home_sellers.htm.
(Continued)

*Primary Examiner* — Talia F Crawley
(74) *Attorney, Agent, or Firm* — Knobbe, Martens, Olson & Bear, LLP

(57) ABSTRACT

A computer-implemented method to provide information characterizing real-estate market conditions within a geographic sub-region included within a larger geographic region is described herein. An indication of the geographic sub-region is received from a user. A memory device on which is stored information characterizing a set of parcels of real property that have been listed for sale is accessed. A parcel of real property located in the sub-region and for which a purchase offer has been made is identified from the stored information. If a purchase transaction for the parcel of real property has not closed, a range of a plurality of values characterizing the purchase offer is provided in at least one graphical user interface. If a purchase transaction for the parcel of real property has closed, a specific value of the plurality of values characterizing the purchase offer is provided in at least one graphical user interface.

12 Claims, 11 Drawing Sheets

Related U.S. Application Data

(60) Provisional application No. 61/800,665, filed on Mar. 15, 2013.

(56) References Cited

U.S. PATENT DOCUMENTS

| | | | |
|---|---|---|---|
| 5,664,115 | A | 9/1997 | Fraser |
| 5,754,939 | A | 5/1998 | Herz et al. |
| 5,844,570 | A | 12/1998 | Curtright et al. |
| 5,884,216 | A | 3/1999 | Shah et al. |
| 6,058,369 | A | 5/2000 | Rothstein |
| 6,684,196 | B1 | 1/2004 | Mini et al. |
| 6,693,651 | B2 | 2/2004 | Biebesheimer et al. |
| 6,704,716 | B1 | 3/2004 | Force |
| 6,785,671 | B1 | 8/2004 | Bailey et al. |
| 6,839,880 | B1 | 1/2005 | Morse et al. |
| 6,882,313 | B1 | 4/2005 | Fan et al. |
| 6,883,002 | B2 | 4/2005 | Faudman |
| 6,968,513 | B1 | 11/2005 | Rinebold et al. |
| 7,016,866 | B1* | 3/2006 | Chin ............... G06Q 30/06 705/26.7 |
| 7,085,650 | B2 | 8/2006 | Anderson |
| 7,212,670 | B1 | 5/2007 | Rousselle et al. |
| 7,283,909 | B1 | 10/2007 | Olsen et al. |
| 7,346,519 | B2 | 3/2008 | Carr et al. |
| 7,584,139 | B2 | 9/2009 | Goodwin et al. |
| 7,827,069 | B2 | 11/2010 | King et al. |
| 8,583,562 | B1* | 11/2013 | McDaniel ........ G06Q 10/10 705/313 |
| 2001/0037273 | A1 | 11/2001 | Greenlee |
| 2001/0039506 | A1 | 11/2001 | Robbins |
| 2002/0010572 | A1 | 1/2002 | Orton et al. |
| 2002/0046077 | A1 | 4/2002 | Mozaeny et al. |
| 2002/0049624 | A1 | 4/2002 | Raveis |
| 2002/0087389 | A1 | 7/2002 | Sklarz et al. |
| 2002/0128857 | A1 | 9/2002 | Lee |
| 2002/0133374 | A1 | 9/2002 | Agoni et al. |
| 2002/0138485 | A1 | 9/2002 | Faudman |
| 2002/0194051 | A1 | 12/2002 | Hall et al. |
| 2003/0011599 | A1 | 1/2003 | Du |
| 2003/0040934 | A1 | 2/2003 | Skidmore et al. |
| 2003/0101063 | A1 | 5/2003 | Sexton et al. |
| 2003/0140064 | A1 | 7/2003 | Klein |
| 2003/0158786 | A1 | 8/2003 | Yaron et al. |
| 2003/0204406 | A1 | 10/2003 | Reardon et al. |
| 2004/0008866 | A1 | 1/2004 | Rhoads et al. |
| 2004/0030616 | A1 | 2/2004 | Florance et al. |
| 2004/0030631 | A1 | 2/2004 | Brown et al. |
| 2004/0039629 | A1 | 2/2004 | Hoffman et al. |
| 2004/0044696 | A1 | 3/2004 | Frost |
| 2004/0046798 | A1 | 3/2004 | Alen |
| 2004/0049406 | A1 | 3/2004 | Muncaster et al. |
| 2004/0064334 | A1 | 4/2004 | Nye |
| 2004/0088172 | A1 | 5/2004 | Baglioni |
| 2004/0098284 | A1 | 5/2004 | Petito et al. |
| 2004/0119759 | A1 | 6/2004 | Barros |
| 2004/0167797 | A1 | 8/2004 | Goncalves |
| 2004/0167798 | A1 | 8/2004 | Hastings |
| 2004/0172418 | A1 | 9/2004 | Dorum et al. |
| 2004/0220906 | A1 | 11/2004 | Gargi et al. |
| 2004/0243533 | A1 | 12/2004 | Dempster et al. |
| 2004/0249705 | A1 | 12/2004 | Spencer et al. |
| 2005/0004927 | A1 | 1/2005 | Singer |
| 2005/0010423 | A1 | 1/2005 | Bagbey et al. |
| 2005/0049953 | A1 | 3/2005 | Vu |
| 2005/0080723 | A1 | 4/2005 | Burchetta et al. |
| 2005/0096926 | A1 | 5/2005 | Eaton et al. |
| 2005/0125237 | A1 | 6/2005 | Harrison |
| 2005/0192930 | A1 | 9/2005 | Hightower et al. |
| 2005/0195219 | A1 | 9/2005 | Hirono |
| 2005/0203671 | A1 | 9/2005 | Mertins et al. |
| 2005/0203768 | A1 | 9/2005 | Florance et al. |
| 2005/0240448 | A1 | 10/2005 | Smith |
| 2005/0273346 | A1 | 12/2005 | Frost |
| 2005/0273354 | A1 | 12/2005 | Adams |
| 2005/0288957 | A1* | 12/2005 | Eraker .............. G06Q 50/16 345/630 |
| 2005/0288958 | A1* | 12/2005 | Eraker ............ G06Q 30/0601 705/316 |
| 2006/0080127 | A1 | 4/2006 | Barry |
| 2006/0111923 | A1 | 5/2006 | Elslager |
| 2006/0167710 | A1 | 7/2006 | King et al. |
| 2006/0174209 | A1 | 8/2006 | Barros |
| 2006/0190277 | A1 | 8/2006 | Zimmerman et al. |
| 2006/0241953 | A1 | 10/2006 | Kravtsov |
| 2006/0241963 | A1 | 10/2006 | Walker et al. |
| 2007/0043770 | A1* | 2/2007 | Goodrich ........ G06F 16/24578 |
| 2007/0100693 | A1* | 5/2007 | Milman ............ G06Q 30/02 705/14.66 |
| 2007/0162347 | A1 | 7/2007 | King et al. |
| 2008/0097767 | A1 | 4/2008 | Milman et al. |
| 2008/0133423 | A1 | 6/2008 | Adiga et al. |
| 2008/0162224 | A1 | 7/2008 | Coon et al. |
| 2011/0010302 | A1 | 1/2011 | Faudman |
| 2012/0158600 | A1* | 6/2012 | Heyer ............ G06Q 30/0601 705/313 |
| 2014/0100905 | A1* | 4/2014 | Alexander ........ G06F 40/134 705/7.19 |
| 2014/0279176 | A1 | 9/2014 | Taylor et al. |
| 2014/0379592 | A1* | 12/2014 | Heyer ............ G06Q 30/0623 705/313 |

OTHER PUBLICATIONS

King, Martin T., U.S. Appl. No. 60/0647,353, filed Jan. 25, 2005, "System and Method for Premarketing High Value Assets," 13 pages.

\* cited by examiner

FIG. 8

Hey Pete, would you pay $470k for this house?

The owner of the home below is thinking of selling. Before they do, they're testing the waters to see if there's enough interest. Would you pay $470k?

| Yes | No |

2802 Fairview Ave E
Seattle, WA 99102

| 2 | 2.5 | 3,170 Sq. Ft. |
| Bed | Bath | $148 / Sq. Ft. |

Thinking of selling your own home? Learn how you can whisper to real buyers

1100

PROVISION OF REAL-ESTATE MARKET INFORMATION

PRIORITY CLAIM

This application is a continuation of U.S. Utility patent application Ser. No. 14/214,155, filed on Mar. 14, 2014, which claims priority from U.S. Provisional Application Ser. No. 61/800,665, filed Mar. 15, 2013, which are hereby incorporated by reference in there entireties as if fully set forth herein.

BACKGROUND

Real estate transactions often involve a buyer, a seller, one or more agents (e.g., a listing agent for the seller and buyer's agent for the buyer), and numerous service providers (e.g., escrow professionals, appraisers, home inspectors, lenders, and so forth). In a typical purchase transaction, the seller lists a property using a listing server, often through a listing agent, while buyers go through a search process to identify potential properties to buy. Once the buyer identifies a property the buyer wants to buy, the buyer makes an offer to the seller, potentially each through their respective agents. The seller may either accept the offer, counteroffer at a different price or other terms, or reject the offer. Once an offer or counteroffer has been accepted, the transaction is typically considered pending and on the way to closing pending inspections, resolving various contingencies, securing funds from a lender, and so forth.

Because of the many events and parties involved in a real estate transaction, it is often difficult for buyers and sellers to keep track of the details of their effort. Buyers need to react quickly to new listings, price drops, and open houses. They also need to coordinate with their agent (and possibly with co-buyers) on events like inspections, contingency removal, loans, and so on. Sellers also need to be aware of price changes that affect the market, changes to the status of nearby homes, and the like. They also need to coordinate with their agent on events like changes to their listing, buyer inspections, and so forth. Keeping track of all of these details can be overwhelming, if not impossible.

BRIEF DESCRIPTION OF THE DRAWING

Preferred and alternative embodiments of the present invention are described in detail below with reference to the following drawing figures.

FIGS. 6-11 are screenshots illustrating functionality of one or more embodiments of the invention.

DETAILED DESCRIPTION

This patent application is intended to describe one or more embodiments of the present invention. It is to be understood that the use of absolute terms, such as "must," "will," and the like, as well as specific quantities, is to be construed as being applicable to one or more of such embodiments, but not necessarily to all such embodiments. As such, embodiments of the invention may omit, or include a modification of, one or more features or functionalities described in the context of such absolute terms.

Figure 1:
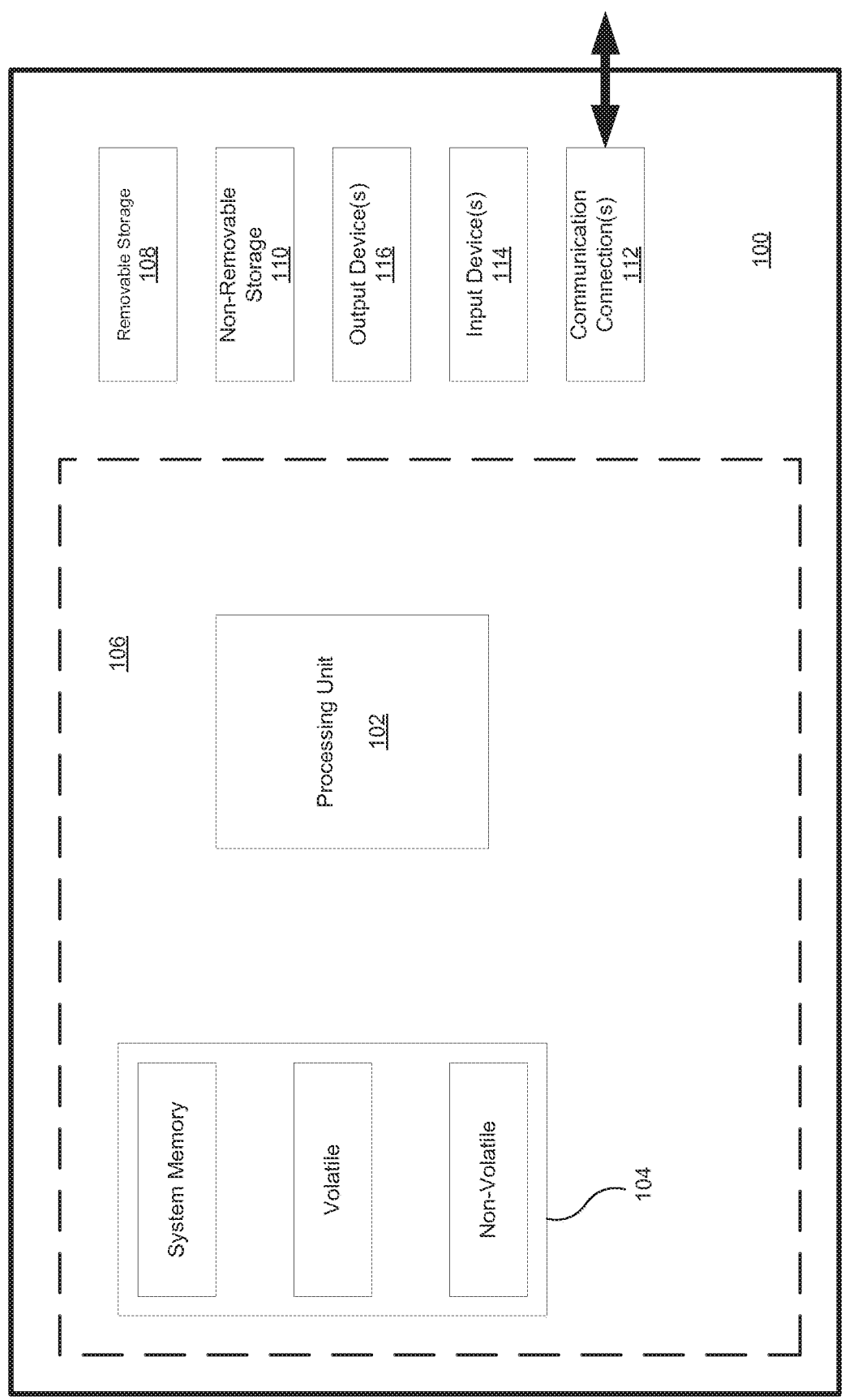
FIG. 1 is a schematic view of an exemplary operating environment in which an embodiment of the invention can be implemented.

FIG. 1 illustrates an example of a computing system environment 100 in which an embodiment of the invention may be implemented. The computing system environment 100, as illustrated, is an example of a suitable computing environment; however it is appreciated that other environments, systems, and devices may be used to implement various embodiments of the invention as described in more detail below.

Embodiments of the invention are operational with numerous general-purpose or special purpose computing system environments or configurations. Examples of well-known computing systems, environments, and/or configurations that may be suitable for use with embodiments of the invention include, but are not limited to, personal computers, server computers, hand-held or laptop devices, multiprocessor systems, microprocessor-based systems, set-top boxes, programmable consumer electronics, network PCs, minicomputers, mainframe computers, distributed computing environments that include any of the above systems or devices, and the like.

Embodiments of the invention may be described in the general context of computer-executable instructions, such as program modules being executed by a computer. Generally, program modules include routines, programs, objects, components, data structures, etc. that perform particular tasks or implement particular abstract data types. Embodiments of the invention may also be practiced in distributed-computing environments where tasks are performed by remote processing devices that are linked through a communications network. In a distributed computing environment, program modules may be located in both local and remote computer storage media including memory storage devices. Additionally, the entity that may implement, or otherwise provide the ability to implement, elements of embodiments of the invention may be referred to herein as an "administrator."

With reference to FIG. 1, an exemplary system for implementing an embodiment of the invention includes a computing device, such as computing device 100. The computing device 100 typically includes at least one processing unit 102 and memory 104.

Depending on the exact configuration and type of computing device, memory 104 may be volatile (such as random-access memory (RAM)), nonvolatile (such as read-only memory (ROM), flash memory, etc.) or some combination of the two. This most basic configuration is illustrated in FIG. 1 by dashed line 106.

Additionally, the device 100 may have additional features, aspects, and functionality. For example, the device 100 may include additional storage (removable and/or non-removable) which may take the form of, but is not limited to, magnetic or optical disks or tapes. Such additional storage is illustrated in FIG. 1 by removable storage 108 and non-removable storage 110. Computer storage media includes volatile and nonvolatile, removable and non-removable media implemented in any method or technology for storage of information such as computer-readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by device 100. Any such computer storage media may be part of device 100.

The device 100 may also include a communications connection 112 that allows the device to communicate with other devices. The communications connection 112 is an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, the communication media includes wired media such as a wired network or direct-wired connection, and wireless media such as acoustic, radio-frequency (RF), infrared and other wireless media. The term computer-readable media as used herein includes both storage media and communication media.

The device 100 may also have an input device 114 such as keyboard, mouse, pen, voice-input device, touch-input device, etc. Further, an output device 116 such as a display, speakers, printer, etc. may also be included. Additional input devices 114 and output devices 116 may be included depending on a desired functionality of the device 100.

According to one or more embodiments, the combination of software or computer-executable instructions with a computer-readable medium results in the creation of a machine or apparatus. Similarly, the execution of software or computer-executable instructions by a processing device results in the creation of a machine or apparatus, which may be distinguishable from the processing device, itself, according to an embodiment.

Correspondingly, it is to be understood that a computer-readable medium is transformed by storing software or computer-executable instructions thereon. Likewise, a processing device is transformed in the course of executing software or computer-executable instructions. Additionally, it is to be understood that a first set of data input to a processing device during, or otherwise in association with, the execution of software or computer-executable instructions by the processing device is transformed into a second set of data as a consequence of such execution. This second data set may subsequently be stored, displayed, or otherwise communicated. Such transformation, alluded to in each of the above examples, may be a consequence of, or otherwise involve, the physical alteration of portions of a computer-readable medium. Such transformation, alluded to in each of the above examples, may also be a consequence of, or otherwise involve, the physical alteration of, for example, the states of registers and/or counters associated with a processing device during execution of software or computer-executable instructions by the processing device.

As used herein, a process that is performed "automatically" may mean that the process is performed as a result of machine-executed instructions and does not, other than the establishment of user preferences, require manual effort.

Figure 2:
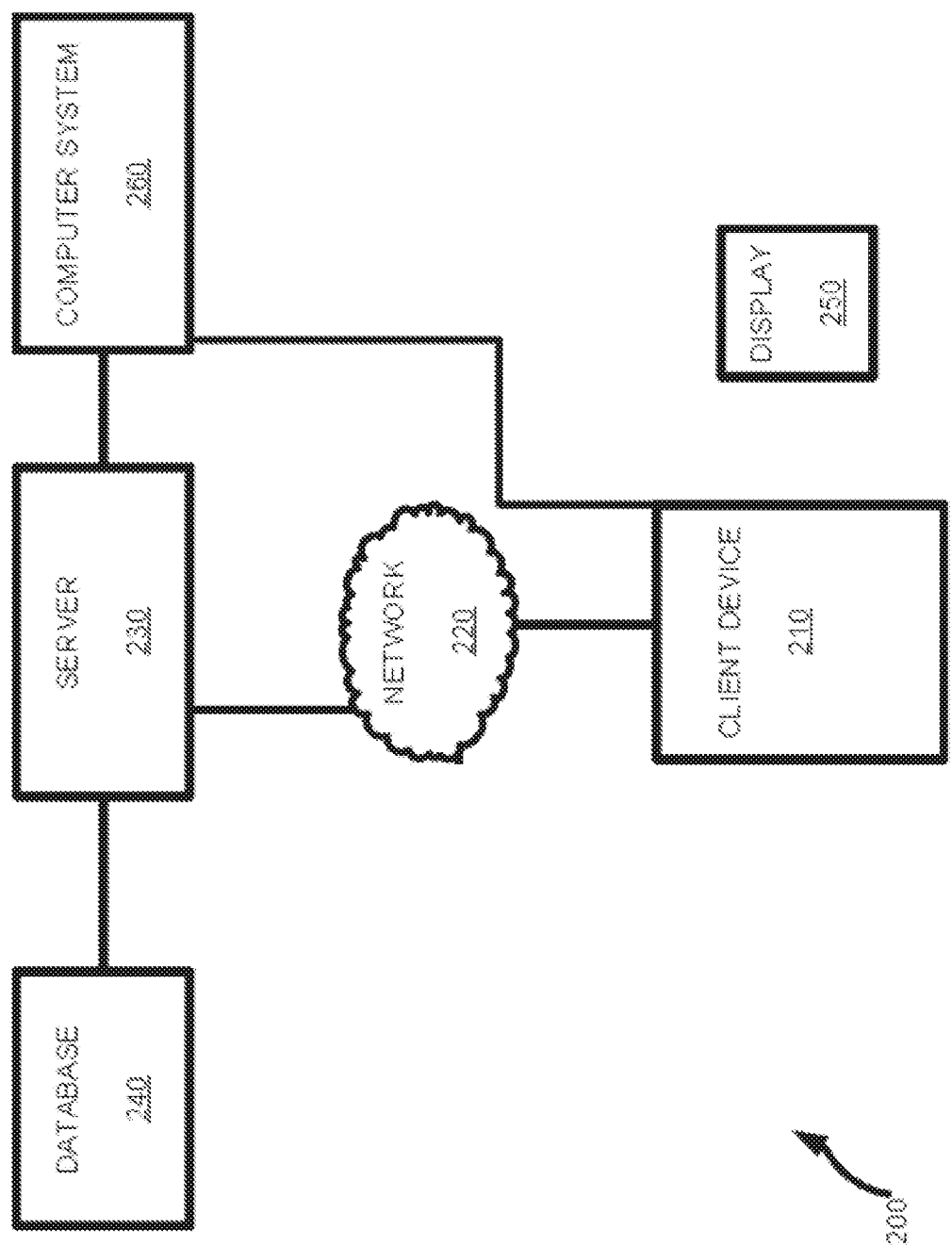
FIG. 2 is a functional block diagram of an exemplary operating environment in which an embodiment of the invention can be implemented.

Referring now to FIG. 2, an embodiment of the present invention may take the form, and/or may be implemented using one or more elements, of an exemplary computer network system 200. The system 200 includes an electronic client device 210, such as a personal computer or workstation, tablet or smart phone, that is linked via a communication medium, such as a network 220 (e.g., the Internet), to an electronic device or system, such as a server 230. The server 230 may further be coupled, or otherwise have access, to a database 240 and a computer system 260. Although the embodiment illustrated in FIG. 2 includes one server 230 coupled to one client device 210 via the network 220, it should be recognized that embodiments of the invention may be implemented using one or more such client devices coupled to one or more such servers.

The client device 210 and the server 230 may include all or fewer than all of the features associated with the device 100 illustrated in and discussed with reference to FIG. 1. The client device 210 includes or is otherwise coupled to a computer screen or display 250. The client device 210 may be used for various purposes such as network- and local-computing processes.

The client device 210 is linked via the network 220 to server 230 so that computer programs, such as, for example, a browser, running on the client device 210 can cooperate in two-way communication with server 230. The server 230 may be coupled to database 240 to retrieve information therefrom and to store information thereto. Database 240 may have stored therein data (not shown) that can be used by the server 230 to enable performance of various aspects of embodiments of the invention. The data stored in database 240 may include, for example, real-property descriptions, real-property listings and/or data characterizing pending or consummated transactions involving real property. Additionally, the server 230 may be coupled to the computer system 260 in a manner allowing the server to delegate certain processing functions to the computer system. In an embodiment, the client device 210 may bypass network 220 and communicate directly with computer system 260.

Still referring to FIG. 2, and in operation according to an embodiment of the invention, a user (not shown) of the client device 210 desiring to evaluate real-estate market conditions in a particular geographic region uses a browser application running on the client device to access web content, which may, but need not, be served by the server 230. Specifically, by employing an appropriate uniform resource locator (URL) in a known manner, the user may navigate to a website hosted by the server 230.

Figure 3:
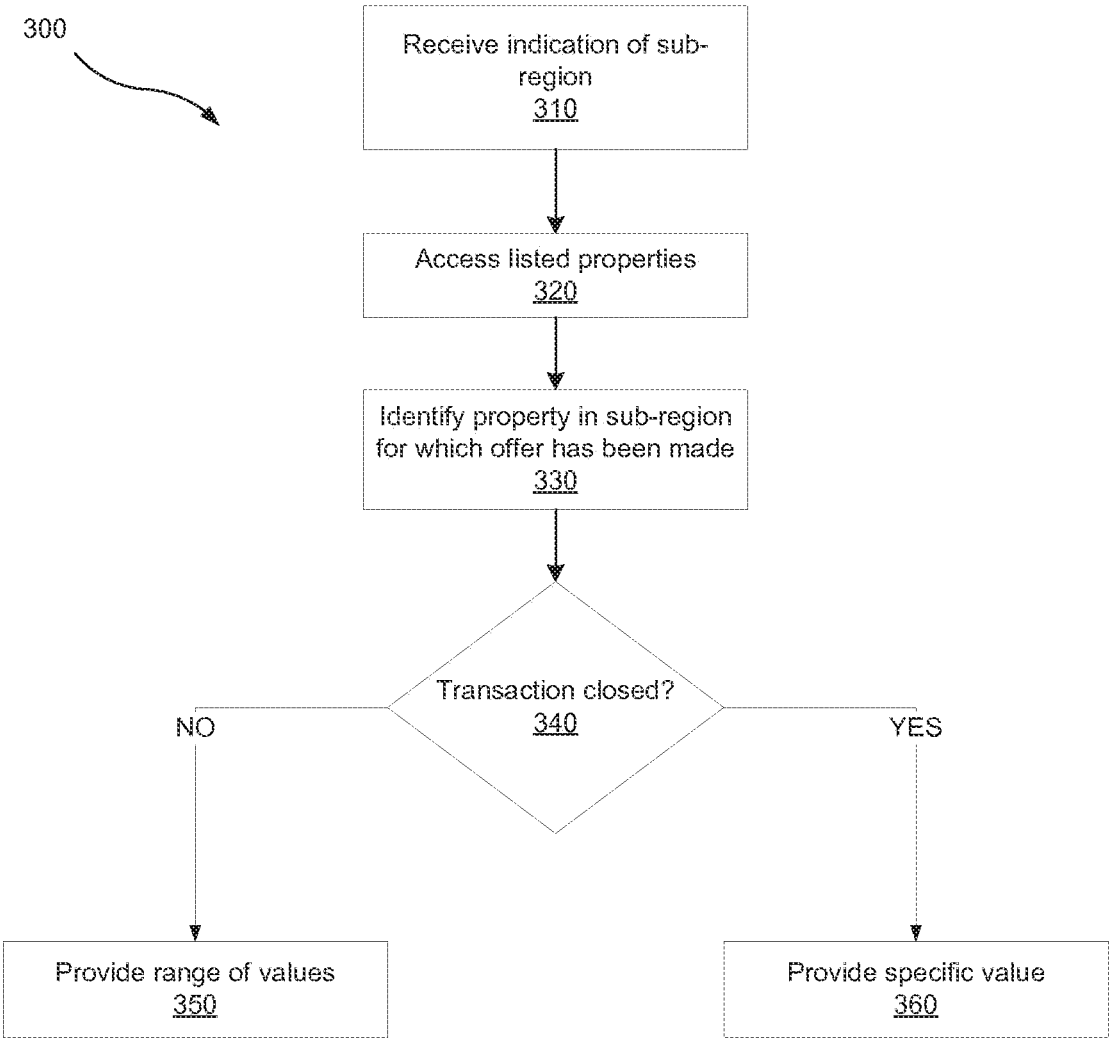
FIGS. 3-5 illustrates processes according to one or more embodiments of the invention.

FIG. 3 illustrates a process 300, according to an embodiment of the invention, for providing information characterizing real-estate market conditions within a geographic sub-region included within a larger geographic region. The geographic region may be any population center, such as a city, having defined political boundaries. Consequently, the sub-region may be a neighborhood, for example, located within a city.

The process 300 is illustrated as a set of operations shown as discrete blocks. One or more steps of the process 300 may be implemented in any suitable hardware, software, including instructions embodied within components, firmware, or combination thereof. The order in which the operations associated with the process 300 are described is not to be necessarily construed as a limitation.

At a block 310, an indication of the geographic sub-region is received from a user. For example, a user of the client device 210 may, using the website, indicate to server 230 a neighborhood in which the user owns a house or would like to purchase a house. In an embodiment, the website provides an interactive map of the geographic region, and the user may define the sub-region by interacting with, or otherwise manipulating, the interactive map in a known manner.

At a block 320, a memory device is accessed on which is stored information characterizing a set of parcels of real property that have been listed for sale. For example, in response to receiving the neighborhood indication from the user, the server 230 and/or computer system 260 may access MLS listings and/or other descriptions of real-property parcels that are stored in database 240. Such parcel descriptions may or may not be submitted for storage in the database 240 by users who are registered with the website of the administrator.

At a block 330, a parcel of real property located in the sub-region and for which a purchase offer has been made is identified from the stored information. For example, from the information stored in the database 240, the server 230 may locate one or more properties located in the indicated neighborhood for which purchase offers have been tendered by one or more prospective buyers.

At a decision block 340, a determination is made as to whether a purchase transaction for the parcel of real property has closed (i.e., the sales transaction involving the parcel has been completely consummated).

Figure 6:
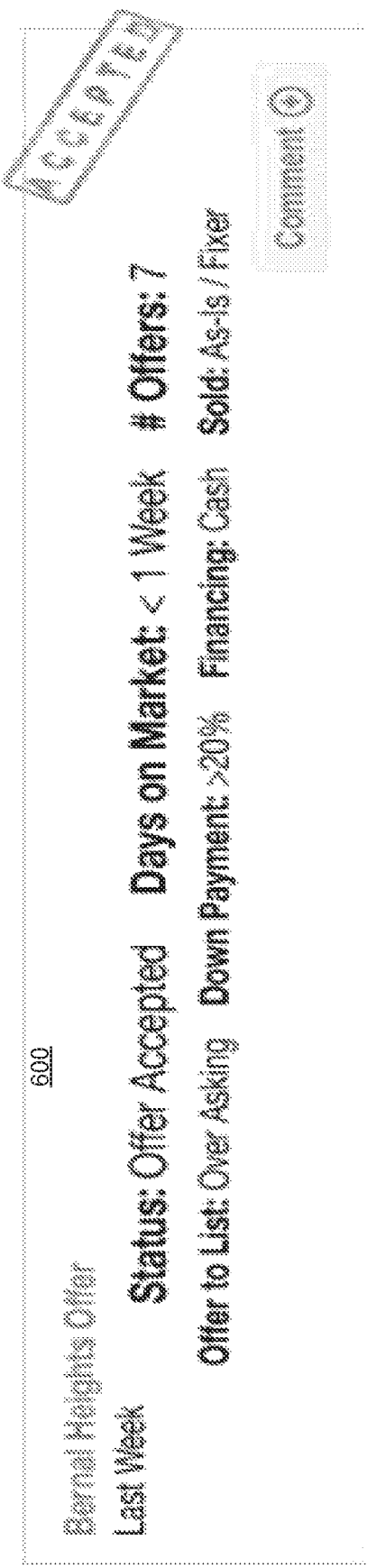

If no purchase transaction has closed on the parcel, then, at a block 350, a range of a plurality of values characterizing the purchase offer is provided in at least one graphical user interface. For example, as illustrated in FIG. 6, in response to receiving the user's neighborhood indication, server 230 may serve to the user a webpage 600 that includes a set of information, stored in database 240, pertaining to the parcel (e.g., a listed property in Bernal Heights) and the one or more offers made for it. However, because the purchase transaction for the parcel has not yet closed, some or all of the information displayed in webpage 600 with which numerical quantities are associated is expressed in terms of a range of values (e.g., "<1 Week") rather than being expressed in terms of a specific numerical value (e.g., "5 days").

As illustrated in FIG. 6, an embodiment of the webpage 600 may include, for example, information indicating whether the offer has been accepted, how many days the parcel has been on the market since its listing, how many days the parcel was on the market between the date of its listing and the date on which the first offer was tendered for it, the number of offers thus far tendered for the parcel, a comparison of the offer price to the list price, down-payment amount, manner of proposed payment and/or financing, and a description of any conditions under which the parcel is offered for sale and/or will be purchased. In an embodiment, all information displayed in webpage 600 pertaining to list price, offer price and any associated payment terms are solely expressed in terms of a range of values.

Figure 7:
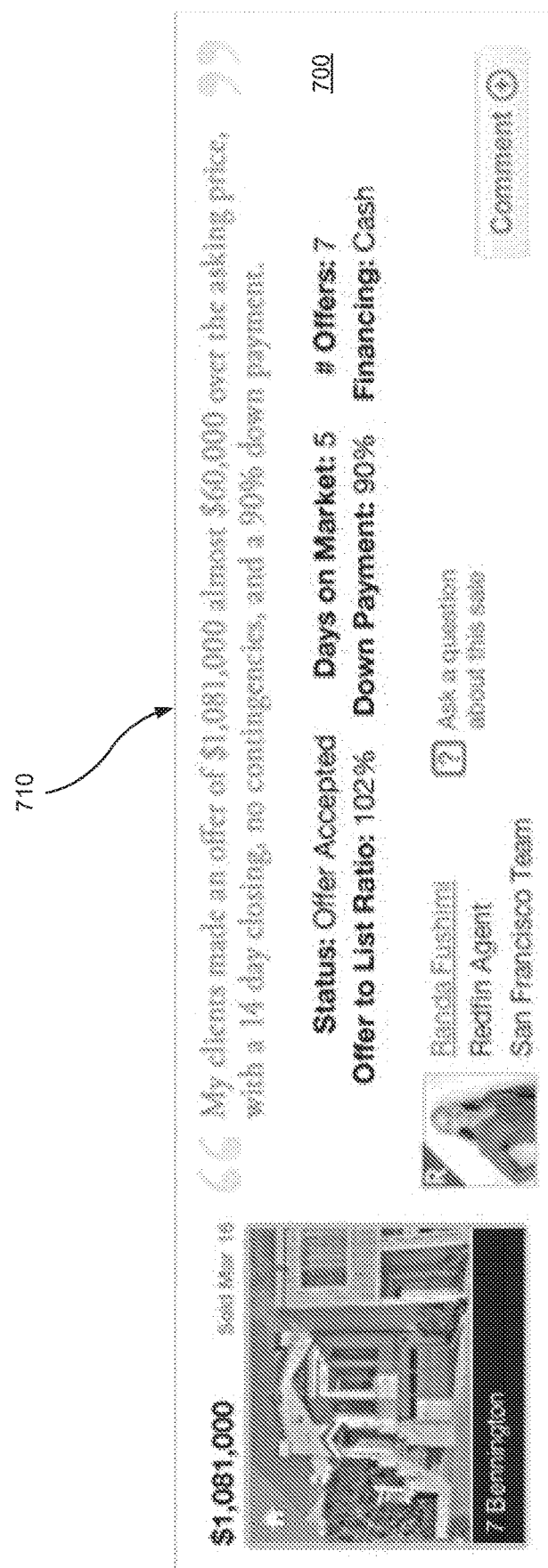

If a purchase transaction has closed on the parcel, then, at a block 360, a specific value of the plurality of values characterizing the purchase offer is provided in at least one graphical user interface. For example, as illustrated in FIG. 7, in response to receiving the user's neighborhood indication, server 230 may serve to the user a webpage 700 that includes a set of information, stored in database 240, pertaining to the parcel and the one or more offers made for it. However, because the purchase transaction for the parcel has closed, some or all of the information displayed in webpage 700 with which numerical quantities are associated is expressed in terms of a specific numerical value (e.g., "5 days") rather than being expressed in terms of a range of values (e.g., "<1 Week").

As illustrated in FIG. 7, an embodiment of the webpage 700 may include, for example, information indicating whether the offer has been accepted, how many days the parcel has been on the market since its listing, how many days the parcel was on the market between the date of its listing and the date on which the first offer was tendered for it, the number of offers thus far tendered for the parcel, a comparison of the offer price to the list price, down-payment amount, manner of proposed payment and/or financing, and a description of any conditions under which the parcel is offered for sale and/or will be purchased. Additionally, the webpage 700 may include a narrative portion 710 describing at least one detail of the purchase transaction. The content of the narrative portion 710 may be supplied by a party, such as a real estate agent, to the close of the purchase transaction. In an embodiment, all information displayed in webpage 700 pertaining to list price, offer price and any associated payment terms are solely expressed in terms of a specific value. Alternatively, webpages 600, 700 may be displayed as sidebar elements in conjunction with other webpages as is known in the art.

Figure 4:
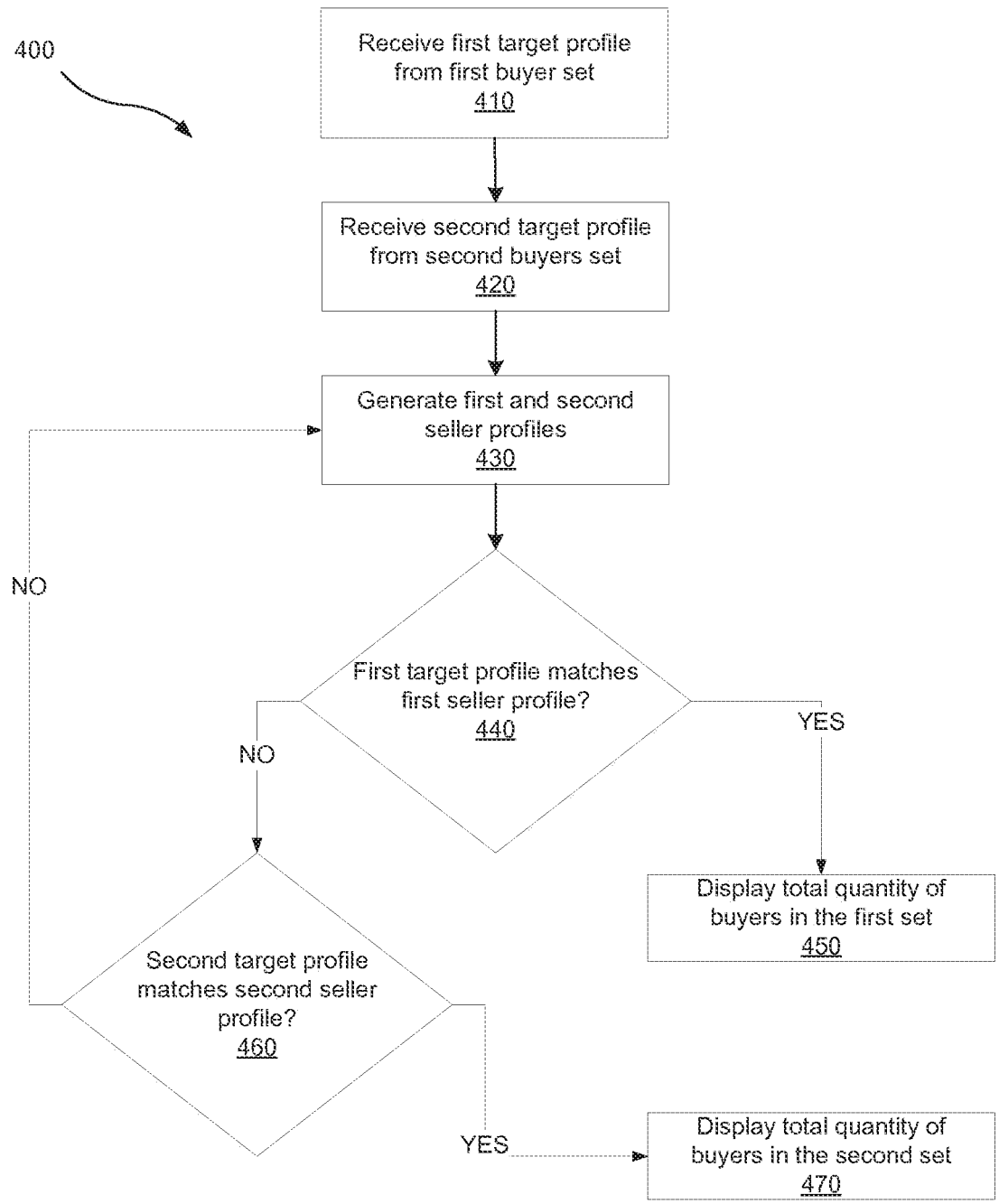

FIG. 4 illustrates a process 400, according to an embodiment of the invention, for enabling a seller entity to estimate market demand for a parcel of real property owned by the seller entity. The process 400 is illustrated as a set of operations shown as discrete blocks. One or more steps of the process 400 may be implemented in any suitable hardware, software, including instructions embodied within components, firmware, or combination thereof. The order in which the operations associated with the process 400 are described is not to be necessarily construed as a limitation.

At a block 410, a selection of a first target profile characterizing a target parcel of real property is received, via an electronic network, from a first set of buyer entities. The first target profile includes a feature description of the target parcel and a first purchase-price range of the target parcel. For example, a first set of users, which may or may not include a user of the client device 210, seeking to purchase a real-property parcel may, using the website, indicate to server 230 a set of one or more parcel qualities considered ideal by each user in the first set. Such qualities may include location, parcel square footage, number of bedrooms, number of bathrooms and/or list price. This set of qualities submitted to server 230 by the users in the first set may be considered a profile of the parcel desired by each such user. By submitting this profile to server 230, the users in the first set choose to receive from the administrator one or more types of notifications concerning parcels that fit the profile and that may come to the attention of the administrator as possibly becoming available for purchase.

At a block 420, a selection of a second target profile characterizing a target parcel of real property is received, via an electronic network, from a second set of buyer entities. The second target profile includes a feature description of the target parcel and a second purchase-price range of the target parcel. For example, a second set of users, which may or may not include a user of the client device 210 or users included in the first set of users, seeking to purchase a real-property parcel may, using the website, indicate to server 230 a set of one or more parcel qualities considered ideal by each user in the second set. Such qualities may include location, parcel square footage, number of bedrooms, number of bathrooms and/or list price. This set of qualities submitted to server 230 by the users in the second set may be considered a profile of the parcel desired by each such user. By submitting this profile to server 230, the users in the second set choose to receive from the administrator one or more types of notifications concerning parcels that fit the profile and that may come to the attention of the administrator as possibly becoming available for purchase.

At a block 430, access, via the electronic network, is provided to the seller entity to at least one user interface enabling the seller entity to input a feature description of the seller parcel and provide first and second proposed purchase prices for the seller parcel. Consequently, a first seller profile is created including the feature description of the seller parcel and the first proposed purchase price, and a second seller profile is created including the feature description of the seller parcel and the second proposed purchase price.

For example, a seller entity who is contemplating selling his property may submit, using a client device at least similar to client device 210, to server 230 a description of his property including characteristics such as location, square footage, number of bedrooms, number of bathrooms and/or proposed or actual list price. After submission, this description, along with an accompanying photograph of the property, may be stored as searchable information in database 240.

Figure 8:
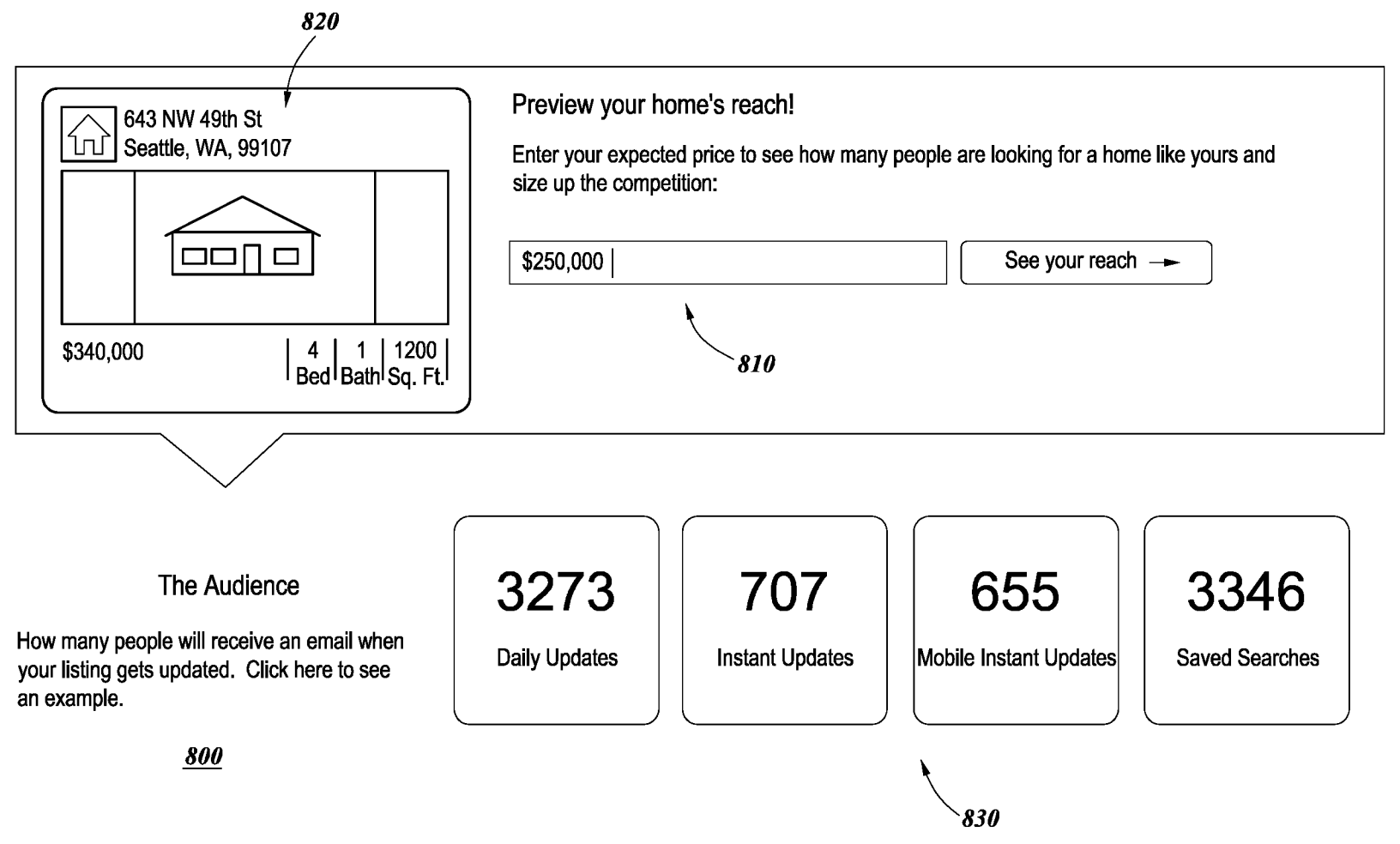

Referring to FIG. 8, and after the aforementioned description is stored in database 240, the seller entity may, via server 230, invoke a webpage 800 that includes a data entry field 810 and, optionally, a rendering 820 of the stored description/photograph. The entry field 810 enables the seller entity to enter one or more proposed purchase prices for his property as a means of gauging market demand for his property, as will be discussed in greater detail below. Each time the seller entity enters a different proposed purchase price into the entry field 810, the server 230 and/or computer system 260 generates an electronic seller profile associated with the property including the stored description of the property and the input proposed purchase price. Consequently, each proposed purchase price input to the entry field 810 is a component of a corresponding different seller profile.

At a decision block 440, a determination is made as to whether the first target profile matches the first seller profile. For example, the server 230 and/or the computer system 260 may compare a first seller profile associated with a first proposed purchase price entered by the seller entity into the entry field 810 with the first target profile associated with the first set of users. That is, in an embodiment, the server 230 and/or the computer system 260 will determine whether the input proposed purchase price, property location, property square footage, etc. associated with the seller's property matches or otherwise falls within the numerical/geographical range of at least a subset of the corresponding criteria included in the target profile associated with the first set of users.

If there is such a match, then, at a block 450, a numerical value indicating a total quantity of buyer entities in the first set is displayed to at least one user interface. For example, and again referring to FIG. 8, having determined that the proposed purchase price entered by the seller entity into entry field 810 has generated a seller profile that matches the target profile associated with the first set of users, server 230 may display within a webpage 800 one or more indicators 830. Indicators 830 illustrate to the seller entity the number of people (i.e., the size of the first set of users) who have indicated their interest in properties having the features and first proposed purchase price of the seller's property by, for example, requesting notification from the administrator that such a property has been listed for sale. By way of illustration, the indicators 830 shown in FIG. 8 provide indications of the number of users who have requested daily updates, instant updates, mobile instant updates, and have recorded saved searches for properties having the features shown in the rendering 820 and the proposed list price entered into entry field 810.

If there is no such match, then, at a decision block 460, a determination is made as to whether the second target profile matches the second seller profile. For example, the server 230 and/or the computer system 260 may compare a second seller profile associated with a second proposed purchase price entered by the seller entity into the entry field 810 with the second target profile associated with the second set of users. That is, in an embodiment, the server 230 and/or the computer system 260 will determine whether the input proposed purchase price, property location, property square footage, etc. associated with the seller's property matches or otherwise falls within the numerical/geographical range of at least a subset of the corresponding criteria included in the target profile associated with the second set of users.

If there is such a match, then, at a block 470, a numerical value indicating a total quantity of buyer entities in the second set is displayed to at least one user interface. For example, and again referring to FIG. 8, having determined that the proposed purchase price entered by the seller entity into entry field 810 has generated a seller profile that matches the target profile associated with the second set of users, server 230 may display within a webpage 800 one or more indicators 830. In a manner similar to that discussed above with reference to block 450 and the first set of users, indicators 830 illustrate to the seller entity the number of people (i.e., the size of the second set of users) who have indicated their interest in properties having the features and second proposed purchase price of the seller's property by, for example, requesting notification from the administrator that such a property has been listed for sale.

If there is no such match, then the process proceeds back to block 430.

Figure 9:
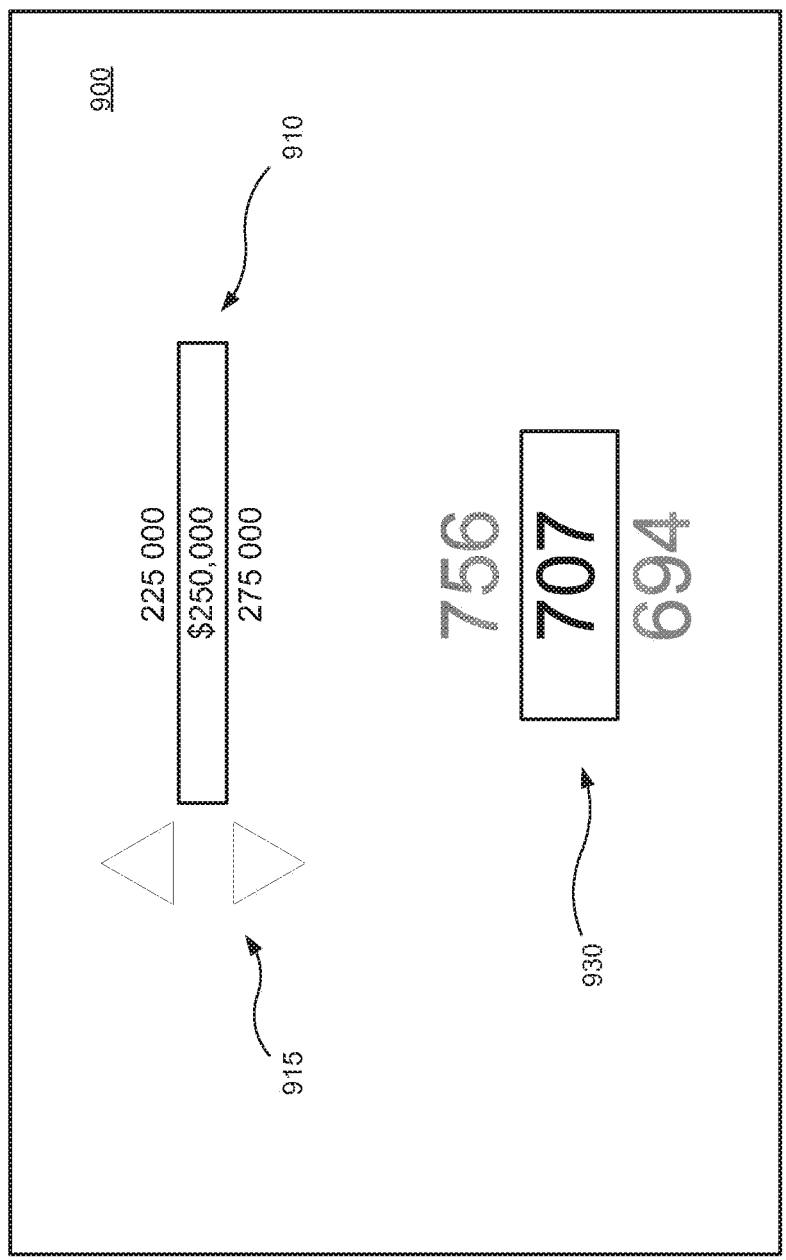

In an alternative embodiment illustrated in FIG. 9, a webpage 900 may be generated under circumstances identical or similar to those under which webpage 800 is generated. Webpage 900 includes an entry field 910, similar in functionality to entry field 810, and one or more indicators 930, similar in functionality to indicators 830. However, in the embodiment illustrated in FIG. 9, the proposed purchase price in entry field 910 may or may not be input by the seller entity and may be incremented and decremented by a predetermined amount using one or more GUI controls 915 known in the art. As the proposed purchase price is incremented/decremented, the quantity of first/second set users shown by indicator 930 is correspondingly modified according to principles discussed above with reference to FIG. 4. Additionally, "ghosted" preview values may be generated proximal to each of the entry field 910 and indicator 930 to allow the seller entity to readily see the effect that modifying the proposed purchase price will have on interest from potential buyers. In the example illustrated in FIG. 9, by changing the proposed purchase price from $250,000 to $225,000, the seller entity may expect the number of interested users to increase from 707 to 756. By changing the proposed purchase price from $250,000 to $275,000, the seller entity may expect the number of interested users to decrease from 707 to 694.

Figure 5:
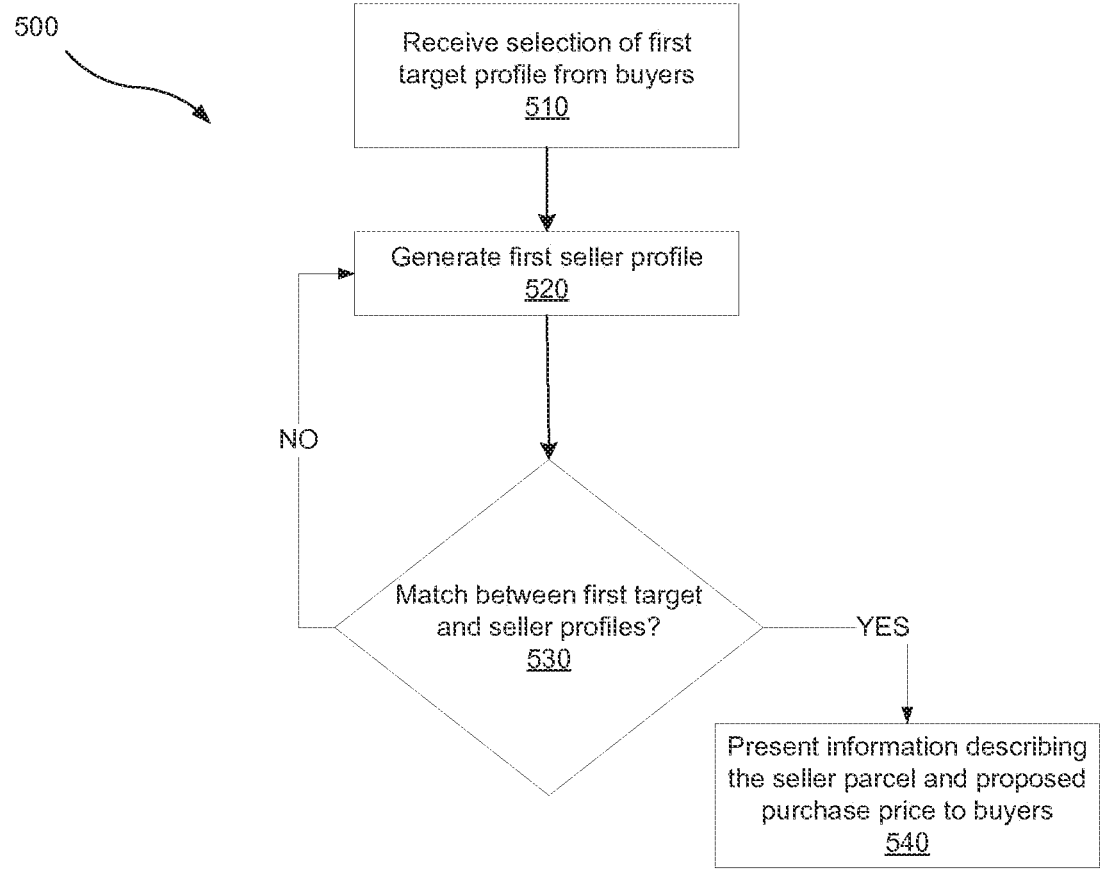

FIG. 5 illustrates a process 500, according to an embodiment of the invention, for enabling a seller entity to estimate market demand for a seller parcel of real property owned by the seller entity. The process 500 is illustrated as a set of operations shown as discrete blocks. One or more steps of the process 500 may be implemented in any suitable hardware, software, including instructions embodied within components, firmware, or combination thereof. The order in which the operations associated with the process 500 are described is not to be necessarily construed as a limitation.

At a block 510, a selection of a first target profile characterizing a target parcel of real property is received from a first set of buyer entities via an electronic network. The first target profile includes a feature description of the target parcel. For example, a first set of users, which may or may not include a user of the client device 210, seeking to purchase a real-property parcel may, using the website, indicate to server 230 a set of one or more parcel qualities considered ideal by each user in the first set. Such qualities may include location, parcel square footage, number of bedrooms, number of bathrooms and/or list price. This set of qualities submitted to server 230 by the users in the first set may be considered a profile of the parcel desired by each such user. By submitting this profile to server 230, the users in the first set choose to receive from the administrator one or more types of notifications concerning parcels that fit the profile and that may come to the attention of the administrator as possibly becoming available for purchase.

At a block 520, access to at least one user interface is provided to the seller entity via the electronic network. Such access enables the seller entity to input a feature description of the seller parcel and provide a proposed purchase price at which the seller entity may agree to sell the seller parcel, thereby creating a first seller profile including the feature description of the seller parcel.

For example, a seller entity who is contemplating selling his property may submit, using a client device at least similar to client device 210, to server 230 a description of his property including characteristics such as location, square footage, number of bedrooms, number of bathrooms. After submission, this description, along with an accompanying photograph of the property, may be stored as searchable information in database 240.

Figure 10:
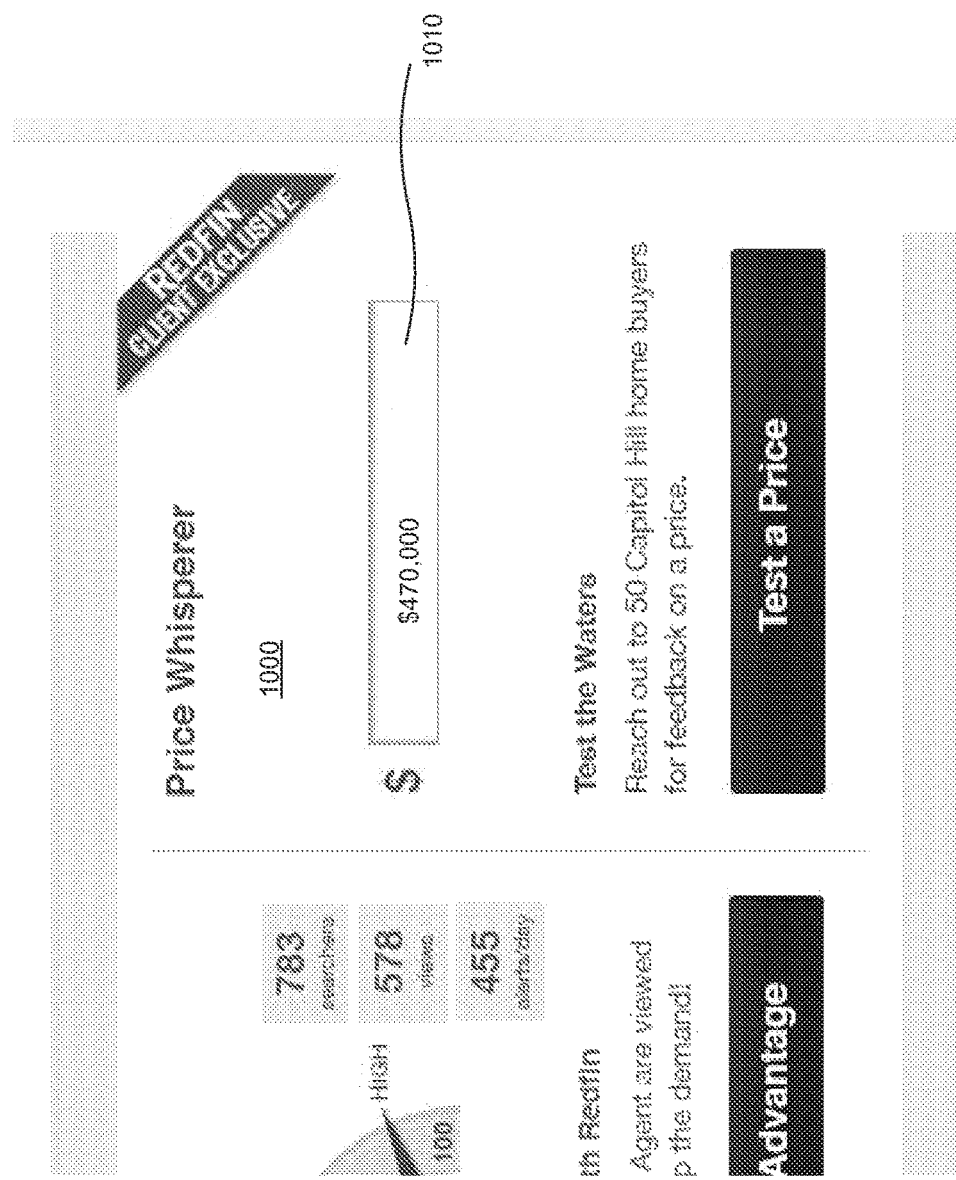

Referring to FIG. 10, and after the aforementioned description is stored in database 240, the seller entity may, via server 230, invoke a webpage 1000 that includes a data entry field 1010. The entry field 1010 enables the seller entity to enter a proposed purchase price for his property as a means of gauging market demand for his property, as will be discussed in greater detail below.

At a decision block 530, a determination is made as to whether there is a match between the first target profile and the first seller profile. For example, the server 230 and/or the computer system 260 may compare the first seller profile with the first target profile associated with the first set of users. That is, in an embodiment, the server 230 and/or the computer system 260 will determine whether the property location, property square footage, etc. associated with the seller's property matches or otherwise falls within the numerical/geographical range of at least a subset of the corresponding criteria included in the target profile associated with the first set of users.

If there is no such match, the process proceeds back to block 520.

Figure 11:
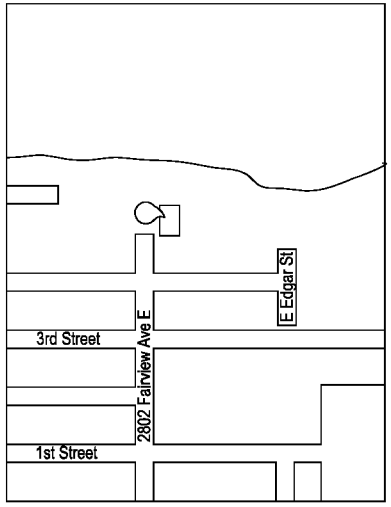
Figure 11:
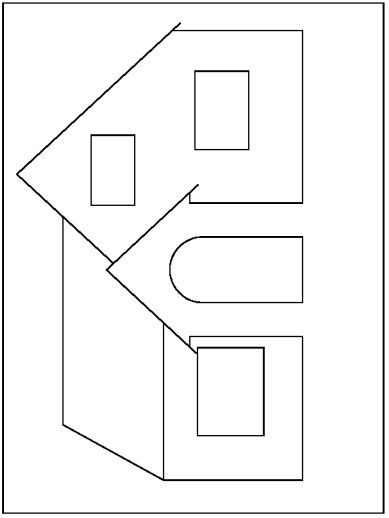

If there is such a match, then at a block 540, information describing the seller parcel and the proposed purchase price is presented to the first set of the buyer entities via the electronic network. For example, and as illustrated in FIG. 11, having determined that there is a match between the first target profile and the first seller profile, server 230 may notify a buyer entity of the aforementioned first set of users via conventional means such as a webpage 1100, for example, that the owner of a property fitting the first target profile may be interested in putting the property up for sale. In response, buyer entities of the first set may respond by providing their respective opinions on whether the proposed purchase price is suitable for the property. The administrator may thereafter generate a report to the seller entity based on these opinions received from the buyer entities.

From the foregoing, it will be appreciated that specific embodiments of the personalized feed system have been described herein for purposes of illustration, but that various modifications may be made without deviating from the spirit and scope of the invention. Accordingly, the invention is not limited except as by the appended claims.

What is claimed is:

1. At least one non-transitory computer-readable medium on which are stored instructions that, when executed by at least one processing device, cause the at least one processing device to perform a method of enabling a seller entity to estimate market demand for a seller parcel of real property owned by the seller entity, the method comprising:
   receiving from each of multiple buyer entities, via an electronic network, information designating a target profile for the buyer entity, the target profile associated with a target parcel of real property and including a feature description of the target parcel and a purchase-price range of the target parcel; and
   providing to the seller entity, via the electronic network, at least one user interface that:
      provides to the seller entity a first control to input a feature description of the seller parcel and provide a proposed purchase price for the seller parcel, thereby creating a seller profile including the feature description of the seller parcel and the proposed purchase price;
      if there is a match between at least one target profile of at least one buyer entity of the multiple buyer entities and the seller profile, displays on the at least one user interface a first numerical value indicating a total quantity of buyer entities in the multiple buyer entities whose target profile matches the seller profile; and
      provides to the seller entity a second control selectable to increase the proposed purchase price to an increased purchase price, wherein the second control is associated in the at least one user interface with a second numerical value displayed in the interface, the second numerical value indicating a total quantity of buyer entities in the multiple buyer entities whose target profile would match the seller profile if modified to include the increased purchase price; and
      provides to the seller entity a third control selectable to decrease the proposed purchase price to a decreased purchase price, wherein the third control is associated in the at least one user interface with a third numerical value displayed in the interface, the third numerical value indicating a total quantity of buyer entities in the multiple buyer entities whose target profile would match the seller profile if modified to include the decreased purchase price.

2. The medium of claim 1, wherein the feature description comprises location of parcel of real property.

3. The medium of claim 1, wherein the feature description comprises square footage of parcel of real property.

4. The medium of claim 1, wherein at least one target profile further includes a mode of electronic delivery of information pertaining to the target parcel.

5. The medium of claim 1, wherein the at least one user interface further:
   receives from the seller entity a selection of the third control; and
   responsive to selection of the third control:
      updates the seller profile to cause the proposed purchase price to match the decreased purchase price;
      modifies the first numerical value to indicate the total quantity of buyer entities in the multiple buyer entities whose target profile matches the seller profile as modified to include the decreased purchase price;
modifies the third control as selectable to decrease the proposed purchase price to a second decreased purchase price; and
modifies the third numerical value to indicate a total quantity of buyer entities in the multiple buyer entities whose target profile would match the seller profile if modified to include the second decreased purchase price.

6. The medium of claim 1, wherein the at least one user interface further:
receives from the seller entity a selection of the second control; and
responsive to selection of the second control:
updates the seller profile to cause the proposed purchase price to match the increased purchase price;
modifies the first numerical value to indicate the total quantity of buyer entities in the multiple buyer entities whose target profile matches the seller profile as modified to include the increased purchase price;
modifies the second control as selectable to increase the proposed purchase price to a second increased purchase price; and
modifies the third numerical value to indicate a total quantity of buyer entities in the multiple buyer entities whose target profile would match the seller profile if modified to include the second increased purchase price.

7. A computer-implemented method comprising:
receiving from each of multiple buyer entities, via an electronic network, information designating a target profile for the buyer entity, the target profile associated with a target parcel of real property and including a feature description of the target parcel and a purchase-price range of the target parcel; and
providing to a seller entity access, via the electronic network, at least one user interface that:
provides to the seller entity a first control to input a feature description of a seller parcel and provide a proposed purchase price for the seller parcel, thereby creating a seller profile including the feature description of the seller parcel and the proposed purchase price;
if there is a match between at least one target profile of at least one buyer entity of the multiple buyer entities and the seller profile, displays on the at least one user interface a first numerical value indicating a total quantity of buyer entities in the multiple buyer entities whose target profile matches the seller profile; and
provides to the seller entity a second control selectable to increase the proposed purchase price to an increased purchase price, wherein the second control is associated in the at least one user interface with a second numerical value displayed in the interface, the second numerical value indicating a total quantity of buyer entities in the multiple buyer entities whose target profile would match the seller profile if modified to include the increased purchase price; and
provides to the seller entity a third control selectable to decrease the proposed purchase price to a decreased purchase price, wherein the third control is associated in the at least one user interface with a third numerical value displayed in the interface, the third numerical value indicating a total quantity of buyer entities in the multiple buyer entities whose target profile would match the seller profile if modified to include the decreased purchase price.

8. The computer-implemented method of claim 7, wherein the at least one user interface further:
receives from the seller entity a selection of the third control; and
responsive to selection of the third control:
updates the seller profile to cause the proposed purchase price to match the decreased purchase price;
modifies the first numerical value to indicate the total quantity of buyer entities in the multiple buyer entities whose target profile matches the seller profile as modified to include the decreased purchase price;
modifies the third control as selectable to decrease the proposed purchase price to a second decreased purchase price; and
modifies the third numerical value to indicate a total quantity of buyer entities in the multiple buyer entities whose target profile would match the seller profile if modified to include the second decreased purchase price.

9. The computer-implemented method of claim 7, wherein the at least one user interface further:
receives from the seller entity a selection of the second control; and
responsive to selection of the second control:
updates the seller profile to cause the proposed purchase price to match the increased purchase price;
modifies the first numerical value to indicate the total quantity of buyer entities in the multiple buyer entities whose target profile matches the seller profile as modified to include the increased purchase price;
modifies the second control as selectable to increase the proposed purchase price to a second increased purchase price; and
modifies the third numerical value to indicate a total quantity of buyer entities in the multiple buyer entities whose target profile would match the seller profile if modified to include the second increased purchase price.

10. A system comprising:
a data store including computer-executable instructions; and
a processor configured to execute the computer-executable instructions to:
receive from each of multiple buyer entities, via an electronic network, information designating a target profile for the buyer entity, the target profile associated with a target parcel of real property and including a feature description of the target parcel and a purchase-price range of the target parcel; and
provide to a seller entity access, via the electronic network, at least one user interface that:
provides to the seller entity a first control to input a feature description of a seller parcel and provide a proposed purchase price for the seller parcel, thereby creating a seller profile including the feature description of the seller parcel and the proposed purchase price;
if there is a match between at least one target profile of at least one buyer entity of the multiple buyer entities and the seller profile, displays on the at least one user interface a first numerical value indicating a total quantity of buyer entities in the multiple buyer entities whose target profile matches the seller profile; and provides to the seller entity a second control selectable to increase the proposed purchase price to an increased purchase price, wherein the second control is associated in the at least one user interface with a second numerical value displayed in the interface, the second numerical value indicating a total quantity of buyer entities in the multiple buyer entities whose target profile would match the seller profile if modified to include the increased purchase price; and provides to the seller entity a third control selectable to decrease the proposed purchase price to a decreased purchase price, wherein the third control is associated in the at least one user interface with a third numerical value displayed in the interface, the third numerical value indicating a total quantity of buyer entities in the multiple buyer entities whose target profile would match the seller profile if modified to include the decreased purchase price.

11. The system of claim 10, wherein the at least one user interface further:

receives from the seller entity a selection of the third control; and responsive to selection of the third control:
updates the seller profile to cause the proposed purchase price to match the decreased purchase price;
modifies the first numerical value to indicate the total quantity of buyer entities in the multiple buyer entities whose target profile matches the seller profile as modified to include the decreased purchase price;
modifies the third control as selectable to decrease the proposed purchase price to a second decreased purchase price; and
modifies the third numerical value to indicate a total quantity of buyer entities in the multiple buyer entities whose target profile would match the seller profile if modified to include the second decreased purchase price.

12. The system of claim 10, wherein the at least one user interface further:

receives from the seller entity a selection of the second control; and responsive to selection of the second control:
updates the seller profile to cause the proposed purchase price to match the increased purchase price;
modifies the first numerical value to indicate the total quantity of buyer entities in the multiple buyer entities whose target profile matches the seller profile as modified to include the increased purchase price;
modifies the second control as selectable to increase the proposed purchase price to a second increased purchase price; and
modifies the third numerical value to indicate a total quantity of buyer entities in the multiple buyer entities whose target profile would match the seller profile if modified to include the second increased purchase price.

* * * * *